United States Patent
Beveridge et al.

(10) Patent No.: US 9,575,688 B2
(45) Date of Patent: Feb. 21, 2017

(54) RAPID VIRTUAL MACHINE SUSPEND AND RESUME

(71) Applicant: VMware, Inc., Palo Alto, CA (US)

(72) Inventors: Daniel James Beveridge, Apollo Beach, FL (US); Thiruvengada Govindan Thirumal, Bangalore (IN); Kiran Madnani, Santa Clara, CA (US); Neeraj Goyal, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 550 days.

(21) Appl. No.: 13/775,700

(22) Filed: Feb. 25, 2013

(65) Prior Publication Data

US 2014/0173196 A1    Jun. 19, 2014

Related U.S. Application Data

(60) Provisional application No. 61/849,808, filed on Dec. 14, 2012.

(51) Int. Cl.
*G06F 12/00* (2006.01)
*G06F 3/06* (2006.01)
(Continued)

(52) U.S. Cl.
CPC ............ *G06F 3/0655* (2013.01); *G06F 3/061* (2013.01); *G06F 3/0689* (2013.01); *G06F 9/00* (2013.01); *G06F 9/45558* (2013.01); *G06F 9/4856* (2013.01); *G06F 9/5088* (2013.01); *G06F 11/14* (2013.01); *G06F 12/084* (2013.01); *G06F 12/0813* (2013.01); *G06F 12/0868* (2013.01);
(Continued)

(58) Field of Classification Search
CPC  G06F 12/0868; G06F 9/5088; G06F 9/45533; G06F 2009/45575; G06F 9/4856
See application file for complete search history.

(56) References Cited

U.S. PATENT DOCUMENTS 6,795,966 B1    9/2004  Lim et al.
7,484,208 B1    1/2009  Nelson
(Continued)

FOREIGN PATENT DOCUMENTS

GB          2483300 A      3/2012

OTHER PUBLICATIONS

Non-final Office Action dated Mar. 26, 2015, U.S. Appl. No. 13/764,405, 23 pages.
(Continued)

*Primary Examiner* — Reginald Bragdon
*Assistant Examiner* — Hannah A Faye-Joyner
(74) *Attorney, Agent, or Firm* — Patterson & Sheridan LLP

(57) ABSTRACT

A method of enabling "fast" suspend and "rapid" resume of virtual machines (VMs) employs a cache that is able to perform input/output operations at a faster rate than a storage device provisioned for the VMs. The cache may be local to a computer system that is hosting the VMs or may be shared cache commonly accessible to VMs hosted by different computer systems. The method includes the steps of saving the state of the VM to a checkpoint file stored in the cache and locking the checkpoint file so that data blocks of the checkpoint file are maintained in the cache and are not evicted, and resuming execution of the VM by reading into memory the data blocks of the checkpoint file stored in the cache.

19 Claims, 5 Drawing Sheets

(51) Int. Cl.
*G06F 12/08* (2016.01)
*G06F 9/50* (2006.01)
*G06F 9/48* (2006.01)
*G06F 12/12* (2016.01)
*G06F 11/14* (2006.01)
*G06F 9/00* (2006.01)
*G06F 9/455* (2006.01)

(52) U.S. Cl.
CPC ......... *G06F 12/126* (2013.01); *G06F 9/45533* (2013.01); *G06F 11/1438* (2013.01); *G06F 2009/45575* (2013.01); *G06F 2201/815* (2013.01); *G06F 2212/152* (2013.01); *G06F 2212/217* (2013.01)

(56) References Cited

U.S. PATENT DOCUMENTS

| | | |
|---|---|---|
| 7,680,919 B2 | 3/2010 | Nelson |
| 7,725,531 B1 | 5/2010 | Sood et al. |
| 8,151,263 B1 | 4/2012 | Venkitachalam et al. |
| 8,239,633 B2 | 8/2012 | Wood et al. |
| 8,285,808 B1 | 10/2012 | Joel et al. |
| 8,307,187 B2 | 11/2012 | Chawla et al. |
| 8,359,594 B1 | 1/2013 | Davidson et al. |
| 8,413,146 B1 | 4/2013 | McCorkendale et al. |
| 8,499,191 B2 | 7/2013 | Shimada et al. |
| 8,555,274 B1 | 10/2013 | Chawla et al. |
| 8,631,066 B2 | 1/2014 | Lim et al. |
| 8,762,547 B2 | 6/2014 | Stanev |
| 8,793,427 B2 | 7/2014 | Lim et al. |
| 8,793,684 B2 | 7/2014 | Breitgand et al. |
| 8,806,266 B1 | 8/2014 | Qu et al. |
| 8,904,081 B1 | 12/2014 | Kulkarni |
| 9,081,686 B2 | 7/2015 | Beveridge |
| 9,122,765 B1 | 9/2015 | Chen |
| 9,176,677 B1* | 11/2015 | Fradkin ............... G06F 3/0644 |
| 9,213,513 B2 | 12/2015 | Hartz et al. |
| 2004/0010787 A1 | 1/2004 | Traut et al. |
| 2006/0129627 A1 | 6/2006 | Phillips et al. |
| 2006/0227585 A1 | 10/2006 | Tomoda |
| 2006/0242382 A1* | 10/2006 | Griess ............... G06F 3/0608 711/170 |
| 2006/0277585 A1 | 12/2006 | Error et al. |
| 2007/0074208 A1 | 3/2007 | Ling et al. |
| 2007/0204121 A1 | 8/2007 | O'Connor et al. |
| 2009/0007106 A1 | 1/2009 | Araujo, Jr. et al. |
| 2009/0113109 A1 | 4/2009 | Nelson et al. |
| 2009/0204718 A1 | 8/2009 | Lawton et al. |
| 2009/0307441 A1 | 12/2009 | Hepkin et al. |
| 2010/0023942 A1 | 1/2010 | Sheu et al. |
| 2010/0186011 A1 | 7/2010 | Magenheimer |
| 2010/0257524 A1 | 10/2010 | Weissman et al. |
| 2011/0154331 A1 | 6/2011 | Ciano et al. |
| 2012/0017027 A1 | 1/2012 | Baskakov et al. |
| 2012/0066679 A1 | 3/2012 | Pappas et al. |
| 2012/0144391 A1 | 6/2012 | Ueda |
| 2012/0151477 A1 | 6/2012 | Sinha et al. |
| 2012/0204060 A1 | 8/2012 | Swift et al. |
| 2012/0216185 A1 | 8/2012 | Dai et al. |
| 2012/0246645 A1 | 9/2012 | Iikura et al. |
| 2012/0272236 A1 | 10/2012 | Baron |
| 2013/0047160 A1 | 2/2013 | Conover |
| 2013/0067289 A1 | 3/2013 | Maislos et al. |
| 2013/0086200 A1* | 4/2013 | Alanis ............... G06F 9/4856 709/214 |
| 2013/0097377 A1 | 4/2013 | Satoyama et al. |
| 2013/0111474 A1 | 5/2013 | Agarwal et al. |
| 2013/0174096 A1 | 7/2013 | Lewin |
| 2013/0246355 A1 | 9/2013 | Nelson et al. |
| 2013/0332610 A1 | 12/2013 | Beveridge |
| 2014/0047193 A1 | 2/2014 | Gross et al. |
| 2014/0068181 A1 | 3/2014 | Mridha et al. |
| 2014/0075127 A1 | 3/2014 | Garthwaite et al. |
| 2014/0115228 A1 | 4/2014 | Zhou et al. |
| 2014/0156910 A1 | 6/2014 | Uttamchandani et al. |
| 2014/0164718 A1 | 6/2014 | van Schaik et al. |
| 2014/0164723 A1 | 6/2014 | Garthwaite et al. |
| 2014/0173181 A1 | 6/2014 | Beveridge |
| 2014/0173196 A1 | 6/2014 | Beveridge et al. |
| 2014/0173213 A1 | 6/2014 | Beveridge |
| 2014/0215172 A1 | 7/2014 | Tsirkin |
| 2014/0245294 A1 | 8/2014 | Kaul |
| 2014/0366019 A1 | 12/2014 | Bajaj et al. |
| 2015/0058580 A1 | 2/2015 | Lagar Cavilla et al. |
| 2015/0178108 A1 | 6/2015 | Tarasuk-Levin et al. |
| 2015/0178110 A1 | 6/2015 | Li et al. |

OTHER PUBLICATIONS

Non-final Office Action dated Mar. 27, 2015, U.S. Appl. No. 13/764,516, 21 pages.

International Search Report and Written Opinion received in co-pending International Patent Application No. PCT/US2015/046177, filed Aug. 20, 2015. 11 pages.

International Search Report and Written Opinion received in co-pending International Patent Application No. PCT/US2015/046178, filed Aug. 20, 2015. 11 pages.

Haikun Liu et al., "Live Virtual Machine Migration via Asynchronous Replication and State Synchronization," IEEE Transactions on Parallel and Distributed Systems, IEEE Service Center, Los Alamitos, CA, US, vol. 22, No. 12, Dec. 2011, pp. 1986-1999.

Lagar-Cavilla et al., "SnowFiock: Rapid Virtual Machine Cloning for Cloud Computing," ACM, EuroSys '09, Apr. 1-3, 2009.

Morin, Christine and Puaut, Isabelle, "A Survey of Recoverable Distributed Shared Virtual Memory Systems," IEEE Transactions on Parallel and Distributed Systems, vol. 8, No. 9, Sep. 1997.

Yu et al., "A Feather-weight Virtual Machine for Windows Applications," ACM, VEE '06, Jun. 14-16, 2006.

"Atlantis ILIO in XenApp Environments, 1-20 1". Published Apr. 2014. Retrieved on Oct. 15, 2015. Retrieved from the Internet: URL:<http:/ /web .archive.org/web/20 14070 1144808/http:// atlantiscomputing.com/downloads/WPAtlantisiLIOinXenAp-pEnvironments20140424.pdf>. 2 pages.

Atlantis ILIO Diskless VDI for VMware View. Published Jan. 24, 2014. Retrieved Oct. 15, 2015. Retrieved from the Internet:URL:<http://web.archive.org/web/20140124082015/http:// www.atlantiscomputing.com/downloadsDisklessVDI Solution BriefVMWare.pdf>. 2 pages.

Vrable, M. et al. "Scalability, fidelity, and containment in the Potemkin virtual honeyfarm". ACM SIGOPS Operating Systems Review. Published Oct. 20, 2005. Retrieved from the Internet: URL:<http://portal.acm.org/citation.cfm?id=I095825>. 15 pages.

Unknown, "Project Serengeti", accessed at <<http://www. projectserengeti.org>>, accessed on Dec. 19, 2013, 2 pages.

Unknown, "Welcome to Apache Hadoop!", accessed at <<http:// hadoop.apache.org>>, Dec. 12, 2013, 4 pages.

Unknown, "Horizon View", accessed at <<http://www.vmware. com/products!horizon-view>>, accessed on Dec. 19, 2013, 6 pages.

Unknown, "Cloud Foundry Community", accessed at <<http:// www.cloudfoundry.org>>, accessed on Dec. 19, 2013, 2 pages.

Lagar-Ca Villa et al., "SnowFlock: Virtual Machine Cloning as a First Class Cloud Primitive", ACM Transactions on Computing Systems., vol. 29(1), Feb. 2011, 50 pages.

Unknown, "What's new in private Paas? Introducing OpenShift Enterprise 2.0", accessed at <<http://www .redhal.com/aboul/ events-webinars/webinars/20 13-12-17 -openshifl-enterprise-2>>, accessed on Dec. 19, 2013, 1 page.

Unknown, "OpenShift Platform Features", Benefits Document, Red Hat, Inc., 2012, 5 pages.

Unknown, "SnowFlock: Swift VM Cloning for Cloud Computing", accessed at <<http://sysweb.cs.toronto.edu/snowflock>>, accessed on Dec. 19, 2013, 2 pages.

Unknown, "Virtual Memory Streaming", OpenStack, Gridcentric, Inc., 2013, 2 pages.

Unknown, "RemoteApp for Hyper-V", Remote Desktop Services Blog, accessed at <<http://blog.msdn.com/b/rds/archive/2009/12/ 15/remoteapp-for-hyper-v.aspx>>, Dec. 2009, 5 pages.

(56) References Cited

OTHER PUBLICATIONS

Unknown, "LXC", accessed at <<http://en.wikipedia.org/wiki/LXC>>, accessed on Dec. 19, 2013, 2 pages.
Unknown, "Linux-VServer", accessed at <<http://en.wikipedia.org/wiki/Linux-VServem, accessed on Dec. 19, 2013, 3 pages.

* cited by examiner

RAPID VIRTUAL MACHINE SUSPEND AND RESUME

CROSS-REFERENCE TO RELATED APPLICATION(S)

This application claims the benefit of U.S. Provisional Patent Application Ser. No. 61/849,808, filed Dec. 14, 2012, the entire contents of which are incorporated by reference herein.

BACKGROUND

Virtual machine (VM) suspend/resume is a feature in virtualized computer systems that allows administrators to save the running state of a VM and at a later time restore the VM to the exact same running state as when it was suspended. One benefit of resuming from a suspended VM is that the VM does not have to go through a complete boot cycle and as a result the VM can be brought on-line quickly with little or no disruption experienced by users.

The VM suspend/resume feature allows administrators to make efficient use of server resources that support the running VMs. Inactive, but otherwise live, VMs can be suspended to prevent them from consuming server resources. The server resources allocated to the suspended VMs can be re-allocated to active VMs that may benefit from the extra resource availability. In a virtual desktop environment, such as Virtual Desktop Infrastructure (VDI) which is commercially available from VMware, Inc., the resource savings can be enormous because studies have shown that many users stay logged into their remote desktops even though they have disconnected from the remote desktop sessions.

The process of suspending a VM is also referred to as checkpointing, which is described in U.S. Pat. No. 6,795,966, incorporated by reference herein in its entirety. During the VM suspend process, a file (known as a checkpoint file) is created on a storage device, typically a disk array, and the state of the VM, including its memory and CPU state, is stored in the file. During VM resume, this same file is loaded into memory to restore the state of the VM. With a shared storage device, it is possible to resume the VM on a different host than where it was suspended.

The VM suspend/resume process described above works well for the occasional suspend/resume of VMs, but does not scale if many VMs are suspended or resumed at the same time. When a large number of VMs are suspended at the same time, known as a "suspend storm," the process can take a long time to complete and consequently the benefits gained from freeing up hardware resources from the VM suspensions would be delayed. For example, if 100 VMs each having 4 GB of allocated memory are suspended at the same time, this would result in a 100×4 GB (400 GB) of data being written to the storage device. The same applies to a "resume storm," where many users are requesting connections to their VMs at about the same time. In the above example of 100 VMs, if users of such VMs were to request connections to their VMs at about the same time, the VM resume process would require 400 GB of data to be read from the storage device and loaded into memory, inevitably delaying many of the connections requested by the users.

While the impact of the suspend storm can be mitigated to an extent, by scheduling the VM suspensions in a staggered fashion to offset the load on the storage device, the resume storm cannot be staggered, because users are expecting to access their VMs shortly after they have requested access. As a result, the storage device becomes a bottleneck when resuming a large number of VMs at about the same time.

SUMMARY

One or more embodiments disclosed herein provide techniques that enable "fast" suspend and "rapid" resume of VMs by employing a cache that is able to perform input/output operations (IO) at a faster rate than a storage device provisioned for the VMs. The cache may be local to a computer system that is hosting the VMs or may be shared cache commonly accessible to VMs hosted by different computer systems.

A method of managing physical resources in a virtualized computer system including a plurality of host computers, a first storage device accessible by the host computers, and a second storage device, e.g., a local cache or shared cache, accessible by the host computers that has lower input/output latency and higher input/output throughput than the first storage device, according to an embodiment, includes the steps of: making a reservation against available capacity of the second storage device when a VM is powered on in one of the host computers, upon suspending the VM and receiving acknowledgement that a state of the VM has been saved in the second storage device; decreasing the available capacity of the second storage device by the size of the saved state of the VM; and upon resuming the VM, increasing the available capacity of the second storage device by the size of the saved state of the VM and making a reservation against the available capacity of the second storage device.

Further embodiments of the present invention include a non-transitory computer-readable storage medium comprising instructions that cause a computer system to carry out one or more of the above methods.

DETAILED DESCRIPTION

Figure 1:
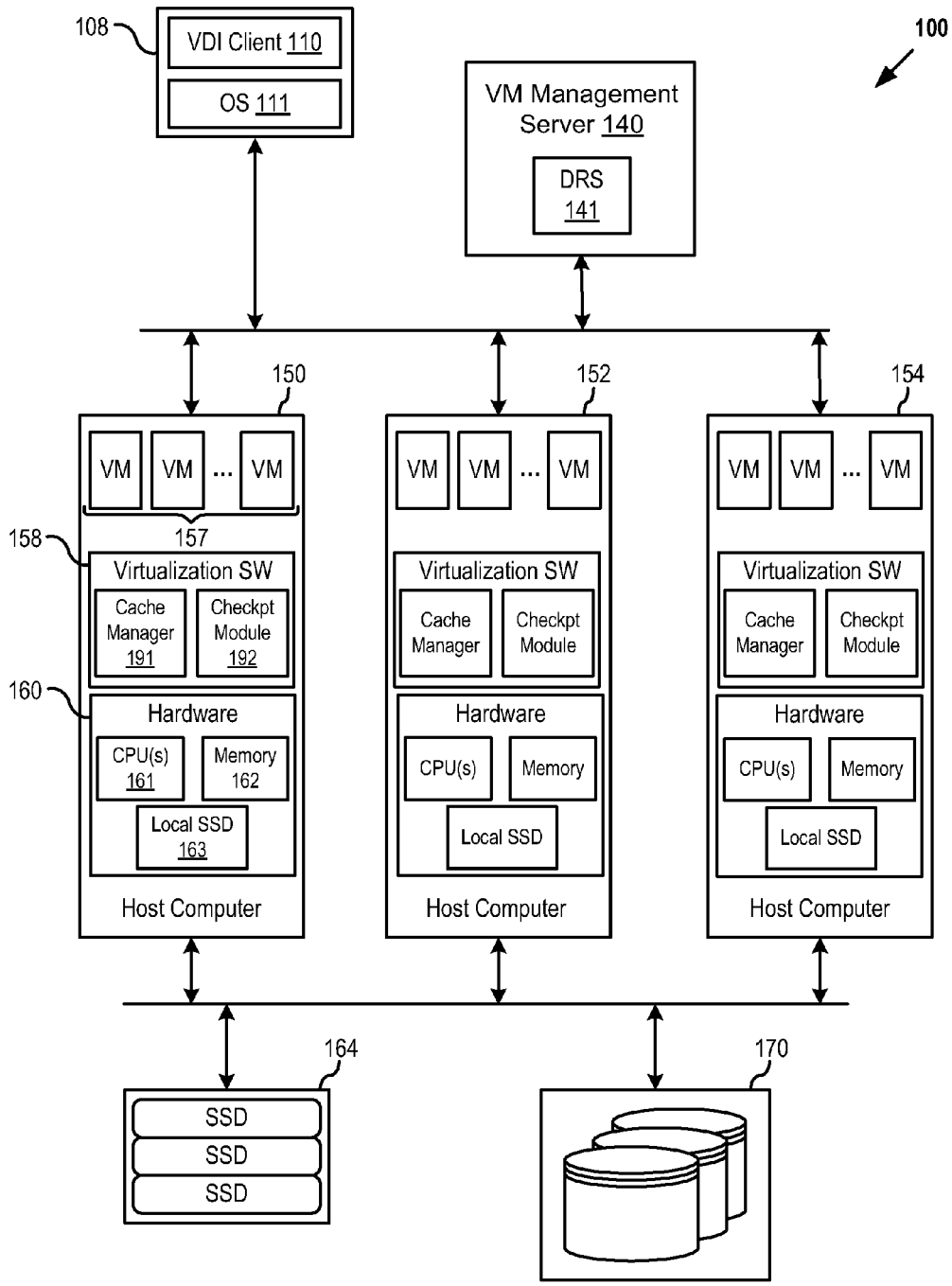
FIG. 1 is a simplified block diagram of a virtualized computer system that implements suspend and resume techniques according to one or more embodiments.

FIG. 1 is a simplified block diagram of a virtualized computer system that implements suspend and resume techniques according to one or more embodiments. In FIG. 1, the virtualized computer system depicted in a simplified block diagram is a virtualized desktop infrastructure (VDI) system 100. Although the example provided herein is a virtualized desktop system, it should be recognized that suspend and resume techniques according to one or more embodiments may be practiced in other types of virtualized computer systems.

In VDI system 100, users are running VDI client software programs (hereinafter referred to as "VDI client 110" individually and "VDI clients 110" collectively) on local computing devices 108. VDI client 110 provides an interface for a user to access his or her desktop, which may be running in one of virtual machines (VMs) 157 or blade server (not shown) in a data center that is remote from the user's location. The term, "desktop" refers to the instance of an interactive operating environment provided by a computer operating system and software applications, typically in the form of a display and sound output and keyboard and mouse input. With VDI clients 110, users can access desktops running in a remote data center through a network (e.g., Internet) from any location, using a general purpose computer running a commodity operating system (OS) 111 and a VDI client software program such as VMware® View™, or a special purpose thin client such as those available from Dell, HP, NEC, Sun Microsystems, Wyse, and others.

In the embodiments described herein, desktops are running in virtual machines 157 and virtual machines 157 are instantiated on a group of host computers commonly referred to as a cluster (depicted in FIG. 1 as host computers 150, 152, 154). Each of the host computers includes virtualization software 158 and hardware 160, including one or more CPUs 161, system memory 162, and local solid state drive (SSD) 163, and is coupled to a shared SSD array 164 and a shared disk array 170. Local SSD 163 is implemented as a multi-purpose IO cache for a host computer to speed up any IOs requested by the VMs running therein. Shared SSD array 164 is implemented as a multi-purpose IO cache for the host computers connected thereto to speed up any IOs requested by the VMs running in them. In one embodiment, shared SSD array 164 is implemented according to techniques disclosed in U.S. Provisional Patent Application Ser. No. 61/728,207, filed Nov. 19, 2012, the entire contents of which are incorporated by reference herein. The embodiments disclosed herein also implement local SSD 163 and/or shared SSD array 164 as an IO cache to enable a VM to be suspended and resumed more rapidly. A virtual machine management server 140 controls VM power on/off in the host computers and has a resource management software module running therein (depicted in FIG. 1 as distributed resource scheduler (DRS) 141) to allocate hardware resources to the VMs (including the local SSD and shared SSD resources) and also perform load balancing on the hardware resources across the VMs. Cache manager 191, which is a component of virtualization software 158, manages the usage of the local SSD and shared SSD resources in conjunction with DRS 141. In other embodiments, storage devices other than SSD may be used, such as phase change memory, so long as they have lower input/output latency and higher input/output throughput than shared disk array 170.

When a user desires to connect to a remote desktop through VDI client 110, the user launches VDI client 110 on local computing device 108 and logs in by providing user credentials. VDI client 110 then communicates with a connection broker (not shown) to authenticate the user. If the authentication is successful, VDI client 110 connects directly to a virtual machine that is configured by VM management server 140 to run an instance of the user's desktop. Until the user logs out of his or her desktop, the instance of the user's desktop will continue running in the virtual machine and will continue consuming hardware resources needed by the virtual machine. In situations where many users do not log out of their remote desktops although they may have disconnected their sessions, hardware resources that are reserved for virtual machines that are supporting such inactive remote desktops can be unnecessarily high. As a way to permit allocation of such reserved but unused hardware resources to other VMs, a checkpoint module that is part of the virtualization software (e.g., checkpoint module 192 of virtualization software 158) is used to suspend the VMs that may still be running to support the inactive remote desktops so that the hardware resources of the VMs, upon suspension, can be freed for reallocation. When users reconnect to their remote desktops, the VMs supporting such remote desktops are resumed.

According to one or more embodiments, the state of the suspended VMs is stored in a cache that is able to perform IO with lower latencies and higher throughputs than a storage device provisioned for the VMs. In the embodiment depicted in FIG. 1, the cache is the multi-purpose cache discussed above, and may be local SSD 163 or shared SSD array 164, and the storage device provisioned for the VMs is shared disk array 170 and is hereinafter sometimes referred to as "storage." In addition, the SSDs of local SSD 163 and shared SSD array 164 may be implemented as flash memory and included as one of hardware resources managed by DRS 141. A file system is implemented in the cache so that the state of the suspended VMs can be saved into the cache as a file and restored from the file during resume. This file is referred to herein as a "checkpoint file" and represents an object that can be created, opened, closed, read, written, and deleted the same way like any object in shared disk array 170.

Figure 2:
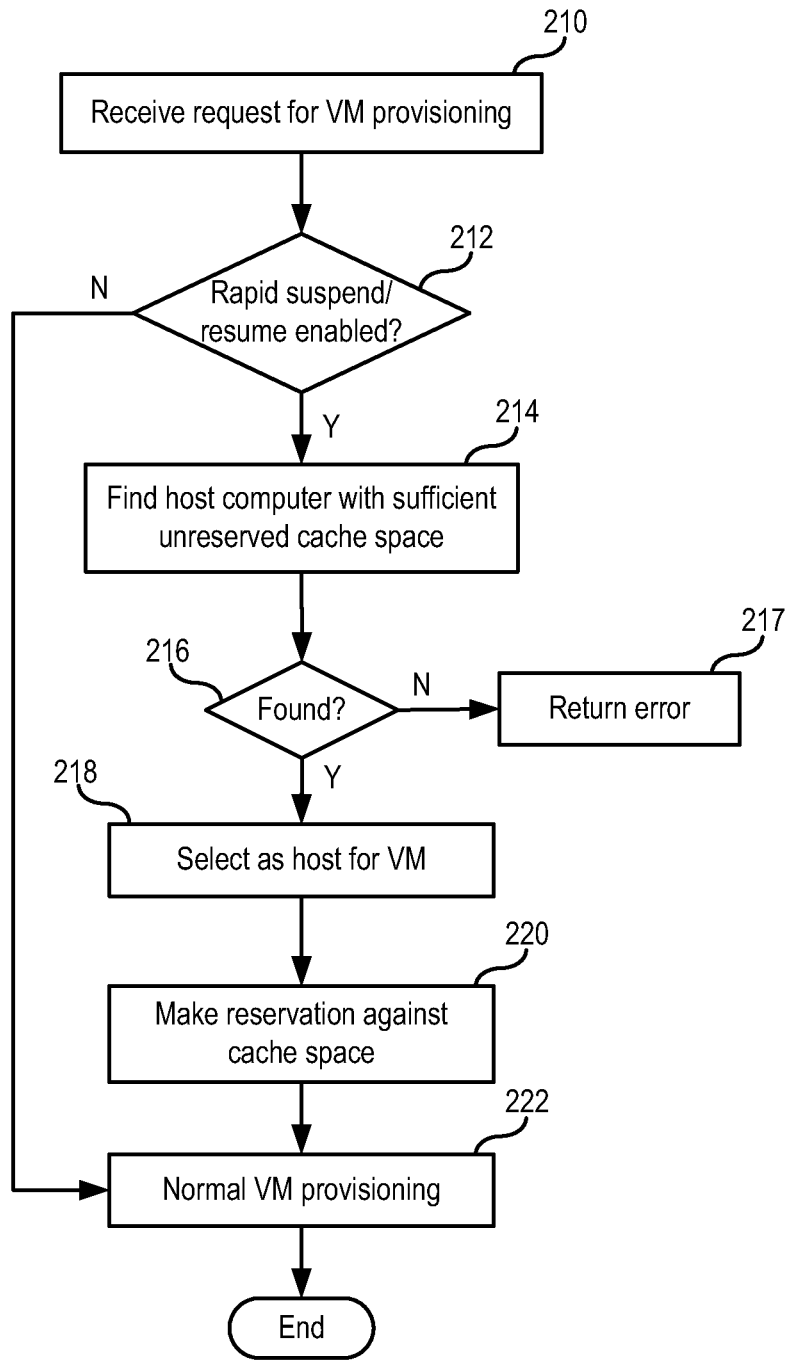
FIG. 2 is a flow diagram of a VM power on process according to an embodiment.

In the virtualized computer system of FIG. 1, the suspend/resume techniques according to one or more embodiments, referred to herein as "rapid suspend/resume," may be enabled for any one of the VMs. FIG. 2 is a flow diagram of a VM power on process that includes additional steps for VMs that have been enabled for rapid suspend/resume. The steps shown in FIG. 2 are carried out by virtual machine management server 140.

The VM power on process begins at step 210 when virtual machine management server 140 receives a request to power on a VM. At step 212, virtual machine management server 140 checks a configuration file for the VM to see if the VM has been enabled for rapid suspend/resume. If not, the VM is powered on in the normal manner (step 222). If the VM has been enabled for rapid suspend/resume, virtual machine management server 140 through DRS 141, which tracks all of the prior cache reservations made, searches for a host computer that has sufficient unreserved cache space to accommodate rapid suspend/resume of the VM. In other words, the size of the unreserved cache space of the host computer has to be equal to or greater than the expected size of the suspended VM image (i.e., the size of the running state of the VM maintained in memory). It should be recognized that the unreserved cache space of the host computer may have been reduced as a result of reservations made against the cache space in accordance with step 220 described below by other VMs that are enabled for rapid suspend/resume and already powered on. In one embodiment, the cache space of the host computer is provided by only the local cache space of the host computer (e.g., space of local SSD 163 for host computer 150). In another embodiment, the cache space of the host computer is provided by only the shared cache space (e.g., space of shared SSD array 164). In other embodiments, the cache space of the host computer is provided by both the local cache space of the host computer and the shared cache space.

If there are no host computers with sufficient cache capacity at step 216, an error is returned at step 217 and the VM is not powered on. On the other hand, if a host computer with sufficient cache capacity is found at step 216, that host computer is selected at step 218 as the host computer in which the VM will be powered on. At step 220, virtual machine management server 140 makes a reservation against the cache space of host computer in the amount equal to the expected size of the suspended VM image. Then, at step 222, the VM is powered on in the host computer selected at step 218 in the normal manner.

Figure 3:
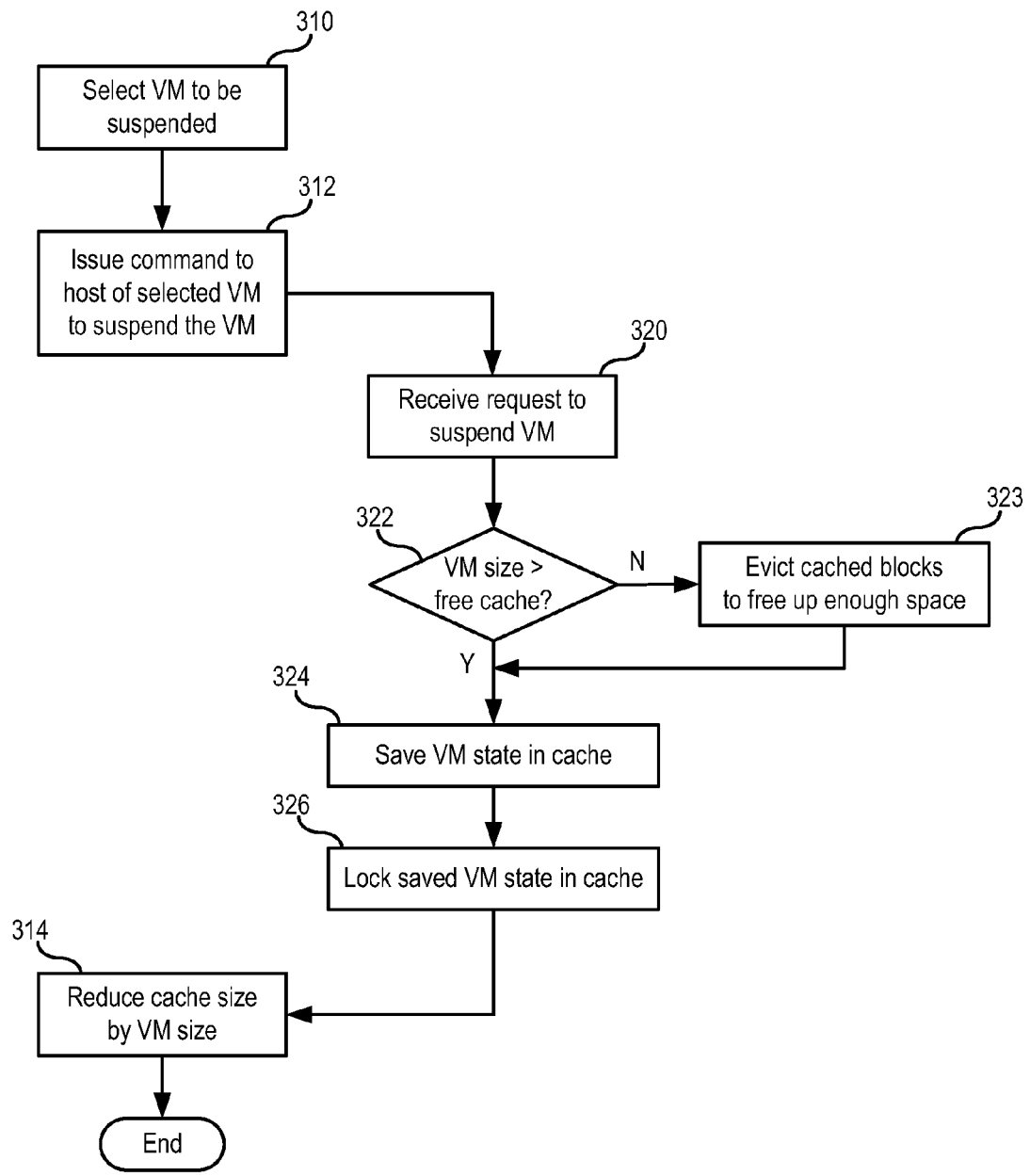
FIG. 3 is a flow diagram of a VM suspend process according to an embodiment.

FIG. 3 is a flow diagram of a VM suspend process according to an embodiment. In the VM suspend process shown in FIG. 3, steps 310, 312, and 314 are carried out by virtual machine management server 140, and steps 320, 322, 323, 324, and 326 are carried out by a host computer (one of host computers 150, 152, 154; in particular, its virtualization software) in which the VM to be suspended is running. In addition, the cache referenced in the description below is the cache in which the VM reserved space when it was powered on.

The VM suspend process begins at step 310 when virtual machine management server 140 selects a VM for suspension. The selection may be in response to an input by an administrator or it may be an automatic selection when virtual machine management server 140 detects that the VM has been idle or has been in a disconnected state for longer than a predetermined amount of time (e.g., 1 hour). At step 312, virtual machine management server 140 issues a command to the host computer of the selected VM to suspend the VM. When, at step 314, virtual machine management server 140 receives an acknowledgement from the host computer that the state of VM selected for suspension has been successfully saved to a checkpoint file, virtual machine management server 140 reduces the size of the cache by the size of the VM's checkpoint file. The cache size is reduced in this manner as a way to ensure that DRS 141 continues to reserve the cache space needed to store the VM's checkpoint file. Because reservations are in general made for executing VMs, without this cache size reduction, DRS 141 may make reservations on cache space that is being used to store the VM's checkpoint file.

Upon receiving the command from virtual machine management server 140 to suspend the selected VM at step 320, a cache manager of the host computer at step 322 compares the expected size of the suspended VM with the free space available in the cache. If the expected size of the suspended VM is greater than the free space available in the cache (e.g., in situation where data blocks from other IOs have filled up the cache), step 323 is executed where the cache manager according to its eviction policy (e.g., an eviction policy based on least recently used or least frequently used) evicts data blocks from the cache. If these blocks are not yet committed to the data store, then they will be sent to shared disk array 170 in sufficient number to accommodate the saving of the suspended VM in the cache at step 324. If the expected size of the suspended VM is less than or equal to the free space available in the cache, step 324 is executed where a checkpoint module of the host computer saves the state of the VM in the cache, in particular to a checkpoint file whose data blocks are stored in the cache. At step 326, the cache manager "locks" the checkpoint file in the cache to prevent the data blocks of the checkpoint file from being evicted from the cache as IOs are being generated while the data blocks of the checkpoint file are maintained in the cache. It should be recognized that without this locking mechanism, not all of the data blocks of the checkpoint file may reside in the cache as a result of eviction and could cause a delay in the resumption of the suspended VM.

In general, embodiments described herein can handle suspend storms much faster relative to conventional techniques, because IOs associated with suspend operations of VMs that are enabled for rapid suspend/resume are being handled by the local SSD or the shared SSD array which has lower IO latency and higher throughput than rotating disk-based storage arrays. In addition, some embodiments throttle VM suspend operations to a certain maximum per hour by placing them in a queue and processing them in accordance with the throttling policy. This ensures a wider dispersion of VM suspend operations during suspend storms.

Figure 4:
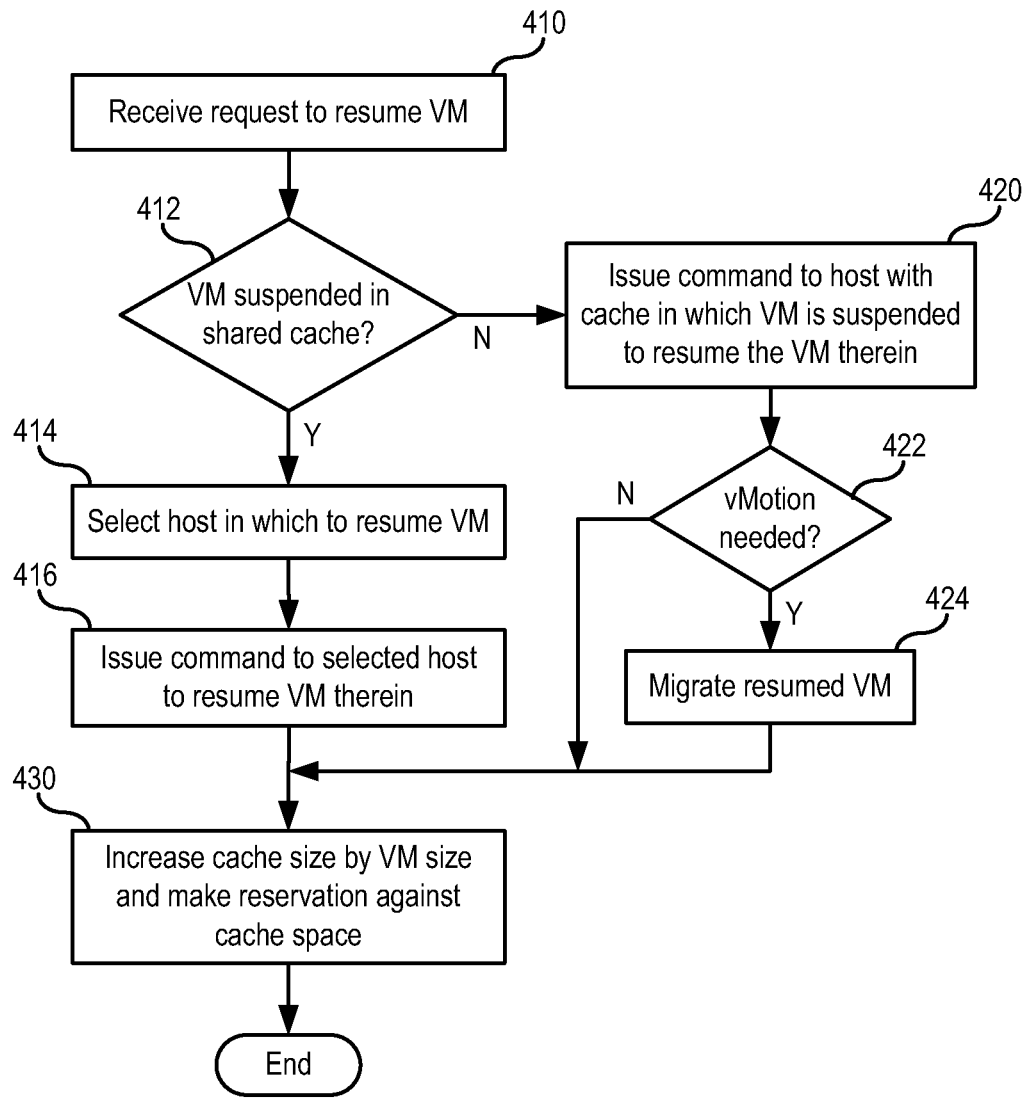
FIG. 4 is a flow diagram of a VM resume process according to an embodiment.

FIG. 4 is a flow diagram of a VM resume process according to an embodiment. The steps shown in FIG. 4 are carried out by virtual machine management server 140. The cache referenced in the description below is the cache in which the VM reserved space when it was powered on.

The VM resume process begins at step 410 when virtual machine management server 140 receives a request to resume a VM. This request may be received, for example, when a VDI user reconnects to a VM that is running an instance of his or her remote desktop. At step 412, virtual machine management server 140 determines if the VM is suspended in a shared cache, e.g., shared SSD array 164 (i.e., the checkpoint file of the VM is stored in the shared cache). If it is, virtual machine management server 140 at step 414 selects a host computer in which to resume the VM. The selection may be made by DRS 141 according to resource availability in the cluster of host computers being managed by virtual machine management server 140. After selecting the host computer at step 414, virtual machine management server 140 at step 416 issues a command to a checkpoint module in the selected host computer to resume execution of the VM. Then, at step 430, virtual machine management server 140 increases size of the cache in which the VM was suspended by the size of the suspended VM image so that the cache space previously occupied by the suspended VM image can be made available for use, and makes a reservation against the shared cache space in the amount equal to the size of the suspended VM image so that, if the VM should be suspended again, sufficient cache space will be available to accommodate this.

If at step 412, virtual machine management server 140 determines that the VM is suspended in a local cache of a host computer (e.g., local SSD 163 of host computer 150), virtual machine management server 140 at step 420 issues a command to a checkpoint module of the host computer with the local cache containing the suspended VM image to resume execution of the VM. Subsequent to the VM being resumed in that host computer, DRS 141 may, according to the resource scheduling policies implemented therein, determine that the host computer is overloaded and at step 422 determine that migration of the resumed VM (vMotion) is needed. The migration of the resumed VM is carried out according to known techniques at step 424. Exemplary implementations of migration of VMs while the VMs are executing (sometime referred to as "live migration") are described in detail in U.S. Pat. No. 7,484,208 which issued on Jan. 27, 2009, and U.S. Pat. No. 7,680,919, which issued on Mar. 16, 2010. These two patents are expressly herein incorporated by reference in their entirety. After step 424, step 430 is carried out as described above (except the reservation is made against the local cache space). If vMotion is not needed, step 424 is skipped and step 430 is executed as described above (except the reservation is made against the local cache space) after step 422.

Figure 5:
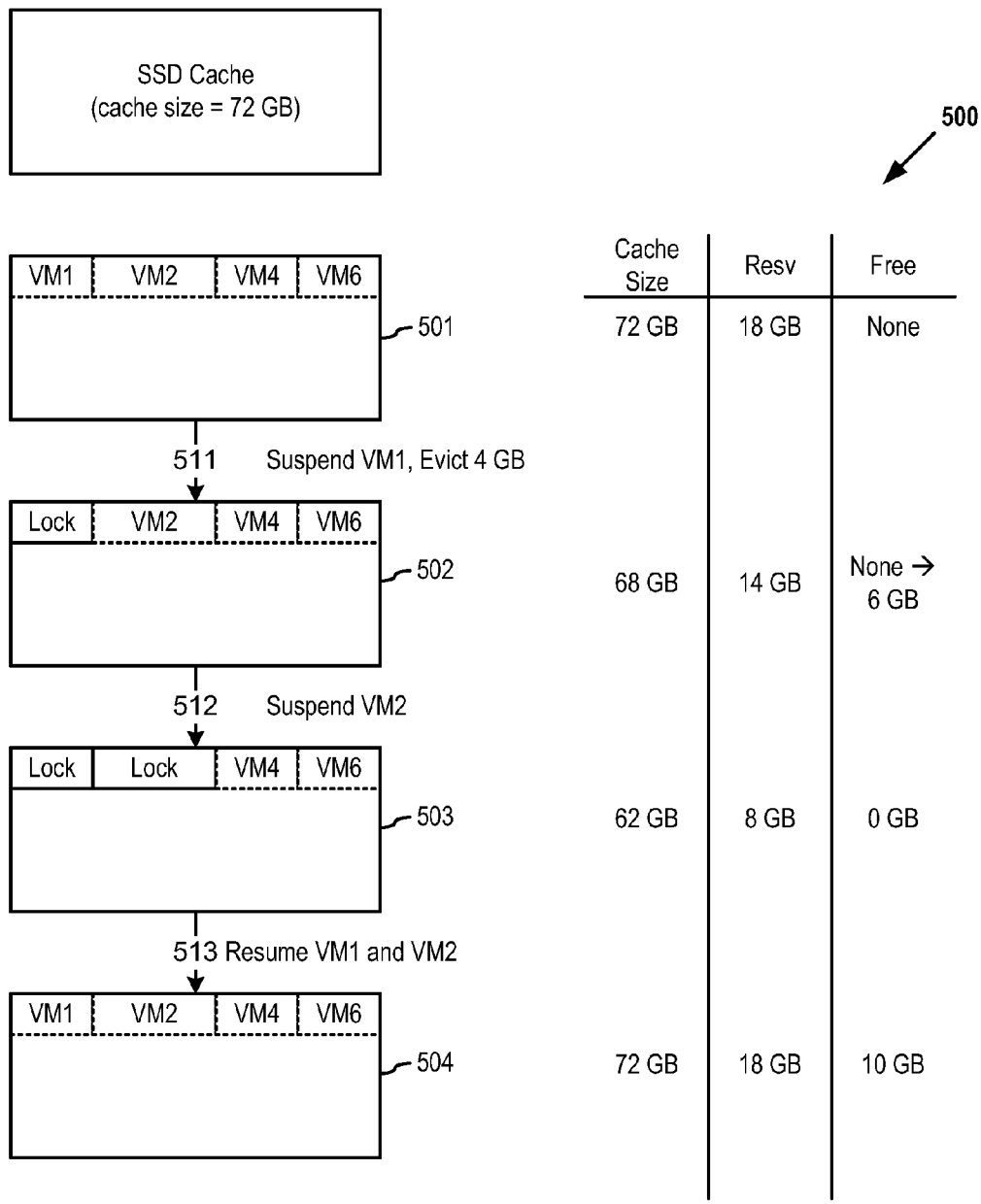
FIG. 5 is a conceptual diagram that illustrates an example of cache reservations according to one or more embodiments.

FIG. 5 is a conceptual diagram that illustrates an example of cache reservations according to one or more embodiments. In the example illustrated in FIG. 5, cache reservations made against cache space of host computer 150 are depicted and it is assumed that the cache of host computer 150 is provided by local SSD 163 or shared SSD 164. It is further assumed that the size of the cache is 72 GB, and six VMs are running in host computer 150, namely VM1, VM2, VM3, VM4, VM5 and VM6, with only VM1, VM2, VM4, and VM6 enabled for rapid suspend/resume. Executing images of VM1, VM2, VM4, and VM6 have sizes of 4 GB, 6 GB, 4 GB, and 4 GB, respectively. As shown in table 500, which depicts the state of the cache, at the beginning of the illustrated process, the cache size is 72 GB and it is assumed for purposes of illustration that there is no free space, i.e., data blocks of IOs have been issued previously in sufficient numbers to have used up all of the cache space. A total of 18 GB of cache reservations have been made for the VMs that have been enabled for rapid suspend/resume and the size of the cache reservations for each of the VMs is illustrated in broken lines in cache space 501.

Arrow 511 depicts a process step in which VM1 is suspended and 4 GB of cached data block are evicted (prior to the suspension) because there is no space in the cache to accommodate the executing image of VM1 which is 4 GB in size. Cache space 502 shows the state of the cache after VM1 is suspended. The portion of cache space 502 that is storing the executing image of VM1 is depicted as being locked. As depicted in table 500, the total cache size is reduced by the size of the locked portion to 68 GB and the total cache reservations is also reduced to 14 GB, reflecting the fact that DRS 141 is no longer making a cache reservation for VM1 because VM is no longer executing.

Prior to the process step depicted by arrow 512 (suspend VM2), it is assumed for purposes of illustration that 6 GB of the cache space has been freed (e.g., as a result of data blocks stored in the cache being invalidated or demoted to storage), which is large enough to accommodate the saving of the executing image of VM2. In this state, when VM2 is suspended, data blocks of the cache need not be evicted to accommodate the saving of the executing image of VM2. Cache space 503 shows the state of the cache after VM2 is suspended. It shows locked portions for suspended images of VM1 and VM2 and reserved portions for VM4 and VM6. As depicted in table 500, the total cache size is reduced to 62 GB (as a result of 6 GB being locked for VM2), the size of cache reservations reduced to 8 GB (reflecting the fact that DRS 141 is no longer making a cache reservation for VM2), and free space reduced to 0 GB (as result of the executing image of VM2 being saved into all of the previously available free space).

Arrow 513 depicts a process step in which the suspended VMs, namely VM1 and VM2 are resumed. Cache space 504 shows the state of the cache after these VMs have resumed. It shows no locked portions and reserved portions for VM1, VM2, VM4, and VM6. As depicted in table 500, the total cache size is increased by 10 GB which is equal to the combined size of the restored images of VM1 and VM2, because this space is now available for DRS 141 to make reservations against. In addition, the size of cache reservation and the size of the free space are shown to have increased by 10 GB also.

In some embodiments, the configuration file for the VM, in addition to indicating whether it is enabled for rapid suspend/resume, may also specify suspend/resume schedule, and DRS 141 would be configured to determine from this schedule how long the VM's suspended image needs to be maintained in the cache. If the schedule indicates that the VM's suspended image no longer needs to be maintained in the cache, DRS 141 may increase the total cache size by the size of the suspended VM image and unlock the data blocks of the suspended VM image so that they can be evicted. DRS 141 also may, in accordance with the schedule, demote the suspended VM image to storage and promote the suspended VM image from storage "just in time" for VM resume. In addition, the configuration file for the VM may specify whether rapid suspend/resume is "best effort." This setting would allow the VM to be powered-on even if sufficient cache space is not available to store its executing state.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a virtualized computer system including a plurality of host computers, a first storage device accessible by the host computers, and a second storage device accessible by the host computers that has lower input/output latency and higher input/output throughput than the first storage device, a method of managing physical resources of the virtualized computer system including the first storage device and the second storage device, said method comprising:
responsive to a request to power on a VM, selecting one of the host computers in which the VM is to be powered on and reserving space in the second storage device in an amount equal to an expected size of a suspended image of the VM;
upon suspending the VM and receiving acknowledgement that the suspended image of the VM has been saved in the second storage device, decreasing an available capacity of the second storage device by the size of the suspended image of the VM; and
upon resuming the VM, increasing the available capacity of the second storage device by the size of the suspended image of the VM and reserving space in the second storage device in an amount equal to the size of the suspended image of the VM.

2. The method of claim 1, wherein the host computers include a first host computer and a second host computer and the VM is powered on in the first host computer.

3. The method of claim 2, wherein the VM is suspended while being executed in the first host computer and is to be resumed in the first host computer for execution therein.

4. The method of claim 3, wherein the second storage device includes a local solid state drive (SSD) configured in the first host computer and, upon suspending the VM, the suspended image of the VM is saved in the local SSD configured in the first host computer.

5. The method of claim 2, wherein the VM is suspended while being executed in the first host computer and is to be resumed in the second host computer for execution therein.

6. The method of claim 5, wherein the second storage device includes a shared solid state drive (SSD) accessible by the first and second host computers and, upon suspending the VM, the suspended image of the VM is saved in the shared SSD.

7. The method of claim 1, wherein the first storage device includes rotating disks and the second storage device does not include rotating disks.

8. The method of claim 1, wherein the first storage device is a disk-based storage array and the second storage device is a solid state drive (SSD).

9. The method of claim 1, further comprising:
responsive to a request to power on another VM, generating an error if a size of an unreserved space in the second storage device is less than an amount equal to an expected size of a suspended image of said another VM.

10. A non-transitory computer readable medium comprising instructions for causing a computer system to carry out a method of managing physical resources thereof, wherein the computer system includes a plurality of host computers, and the physical resources of the computer system include a first storage device accessible by the host computers, and a second storage device accessible by the host computers that has lower input/output latency and higher input/output throughput than the first storage device, said method including the steps of:
responsive to a request to power on a VM, selecting one of the host computers in which the VM is to be powered on and reserving space in the second storage device in an amount equal to an expected size of a suspended image of the VM;
upon suspending the VM and receiving acknowledgement that the suspended image of the VM has been saved in the second storage device, decreasing an available capacity of the second storage device by the size of the suspended image of the VM; and
upon resuming the VM, increasing the available capacity of the second storage device by the size of the suspended image of the VM and reserving space in the second storage device in an amount equal to the size of the suspended image of the VM.

11. The non-transitory computer readable medium of claim 10, wherein the host computers include a first host computer and a second host computer and the VM is powered on in the first host computer.

12. The non-transitory computer readable medium of claim 11, wherein the VM is suspended while being executed in the first host computer and resumed in the first host computer for execution therein.

13. The non-transitory computer readable medium of claim 10, wherein the method further includes the step of:
responsive to a request to power on another VM, generating an error if a size of an unreserved space in the second storage device is less than an amount equal to an expected size of a suspended image of said another VM.

14. A virtualized computer system comprising:
a plurality of host computers each having one or more virtual machines (VMs) running therein;
a storage device accessible by the host computers;
a cache device accessible by the host computers, the cache device having lower input/output latency and higher input/output throughput than the storage device; and
a management server configured to carry out a method of managing the cache device, the method including the steps of
responsive to a request to power on a VM, selecting one of the host computers in which the VM is to be powered on and reserving space in the cache device in an amount equal to an expected size of a suspended image of the VM;

upon suspending the VM and receiving acknowledgement that the suspended image of the VM has been saved in the second storage device, decreasing an available capacity of the second storage device by the size of the suspended image of the VM; and upon resuming the VM, increasing the available capacity of the cache device by the size of the suspended image of the VM and reserving space in the cache device in an amount equal to the size of the suspended image of the VM.

15. The virtualized computer system of claim 14, wherein the cache device includes a local solid state drive (SSD) configured in a host computer and, upon suspending the VM, the suspended image of the VM is saved in the local SSD configured in the host computer.

16. The virtualized computer system of claim 15, wherein the VM is suspended while being executed in the host computer and resumed in another host computer for execution therein.

17. The virtualized computer system of claim 14, wherein the cache device includes a shared SSD accessible by the host computers and, upon suspending the VM, the suspended image of the VM is saved in the shared SSD.

18. The virtualized computer system of claim 17, wherein the VM is suspended while being executed in one of the host computers and resumed in another one of the host computers for execution therein.

19. The virtualized computer system of claim 14, wherein the method further includes the step of:

responsive to a request to power on another VM, generating an error if a size of an unreserved space in the cache device is less than an amount equal to an expected size of a suspended image of said another VM.

* * * * *